United States Patent [19]

Spatafora et al.

[11] Patent Number: 5,044,487

[45] Date of Patent: Sep. 3, 1991

[54] PRODUCT ALIGNING DEVICE, PARTICULARLY FOR SUPPLYING WRAPPING MACHINES

[75] Inventors: Mario Spatafora; Antonio Gamberini, both of Bologna, Italy

[73] Assignee: G.D Societa per Azioni, Bologna, Italy

[21] Appl. No.: 518,505

[22] Filed: May 1, 1990

[30] Foreign Application Priority Data

May 18, 1989 [IT] Italy .................................. 3469 A/89

[51] Int. Cl.$^5$ ............................................ B65G 47/24
[52] U.S. Cl. ..................................... 198/392; 198/443
[58] Field of Search ................... 198/392, 443, 803.16; 221/159, 160, 167, 173

[56] References Cited

U.S. PATENT DOCUMENTS

| | | | |
|---|---|---|---|
| 3,330,403 | 7/1967 | Roberts et al. ........................ | 198/392 |
| 4,007,854 | 2/1977 | Ervine ............................. | 198/392 X |
| 4,401,203 | 8/1983 | McDonald et al. ................. | 198/392 |
| 4,429,808 | 2/1984 | Doty ................................ | 198/392 X |
| 4,527,326 | 7/1985 | Kohno et al. ..................... | 198/392 X |
| 4,848,559 | 7/1989 | Hoppmann et al. ................ | 198/392 |
| 4,921,106 | 5/1990 | Spatafora et al. ................. | 198/392 X |

FOREIGN PATENT DOCUMENTS

| | | | |
|---|---|---|---|
| 0243781 | 11/1987 | European Pat. Off. ............ | 198/392 |
| 0161213 | 12/1981 | Japan .................................. | 198/392 |
| 0127514 | 6/1986 | Japan .................................. | 198/392 |
| 0169408 | 7/1986 | Japan .................................. | 198/392 |
| 1297083 | 11/1972 | United Kingdom ................ | 198/392 |

*Primary Examiner*—D. Glenn Dayoan
*Attorney, Agent, or Firm*—Marshall, O'Toole, Gerstein, Murray & Bicknell

[57] ABSTRACT

A device for aligning products, wherein an annular body turning about its axis presents an annular end surface defining a first route for the product items arranged in line, and an inner lateral surface defining, with the upper surface of a flat disc turning about its axis and on to which the product is fed in bulk, a second annular route for the product; the annular body being inclined in relation to the disc; so as to define a first junction between the first and second route, and a second junction between the first route and a third route defined by an output conveyor tangent to the annular body; the disc being fed in bulk with the product items, which are fed, by centrifugal force, on to the second route and then, one by one, on to the first route via the first junction and on to the third route via the second junction.

9 Claims, 4 Drawing Sheets

PRODUCT ALIGNING DEVICE, PARTICULARLY FOR SUPPLYING WRAPPING MACHINES

BACKGROUND OF THE INVENTION

The present invention relates to a product aligning device, particularly for supplying wrapping machines.

In particular, the present invention relates to an aligning device which may be employed to advantage in the food industry for receiving products in bulk, e.g. sweets, chocolates, etc., and feeding the same, in line and correctly oriented, on to a manufacturing machine, in particular, a wrapping machine.

Known aligning devices used in the food industry comprise a plate turning about its axis and designed to receive the product in bulk. The plate, usually consisting of a disc or, at times, a number of coaxial coplanar annular discs turning at outwardly increasing speeds, turns at such a speed that the centrifugal force acting on each product item, regardless of its position on the plate, never exceeds the frictional force between the item and the plate.

Once unloaded on to the plate in any given position, each item is fed by the plate along a circular route, along which it is directed by fixed obstacles on to circular routes of gradually increasing radius, until it eventually travels along a circular route extending about the periphery of the plate itself, from which it is then fed on to an output conveyor tangent to the plate.

By virtue of the friction between the product items and the surface of the plate and said fixed obstacles, the items are arranged with their longer axis parallel to the travelling direction, and are so aligned as to be fed, uniformly oriented and in single file, on to the output conveyor.

Though perfectly efficient, known aligning devices of the aforementioned type have proved unsuitable for connection to modern wrapping machines, which operate at such high speed as to require the use of two or more devices. This is due to the operating capacity of known aligning devices being limited by the maximum permitted rotation speed of the plate, in excess of which speed the items would be spun off the plate.

SUMMARY OF THE INVENTION

The aim of the present invention is to provide an aligning device which, unlike known devices of the aforementioned type, exploits said centrifugal force for orienting and aligning the product items, thus overcoming the output limitations typically associated with known devices.

With this aim in view, according to the present invention, there is provided a product aligning device designed to receive said product in bulk and to feed the same, correctly oriented and aligned, on to a manufacturing machine, in particular, a wrapping machine; said device comprising a flat disc turning about a first axis; first actuating means for turning said disc about said first axis at a given speed; means for feeding said product in bulk on to the upper surface of said disc; and conveyor means defining, for a neatly arranged row of said product items, an output route substantially tangent to the outer edge of said disc; characterised by the fact that it also comprises an annular body turning about a second axis; and second actuating means for turning said annular body about said second axis at a second given speed; said annular body presenting an upper annular surface located between said outer edge of said disc and said conveyor means and defining a first annular route for a neatly arranged row of said product items, and a substantially cylindrical inner lateral surface surrounding said outer edge of said disc and defining, with the upper surface of the same, a second annular route for said product items; said first route being inclined in relation to both said second route and said output route, so as to define a first junction between said first and second route, and a second junction between said first and said output route; said first speed being such as to enable said product items to be fed, by centrifugal force, from respective positions on said upper surface of said disc on to said second route and, one by one, through said first junction on to said first route.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
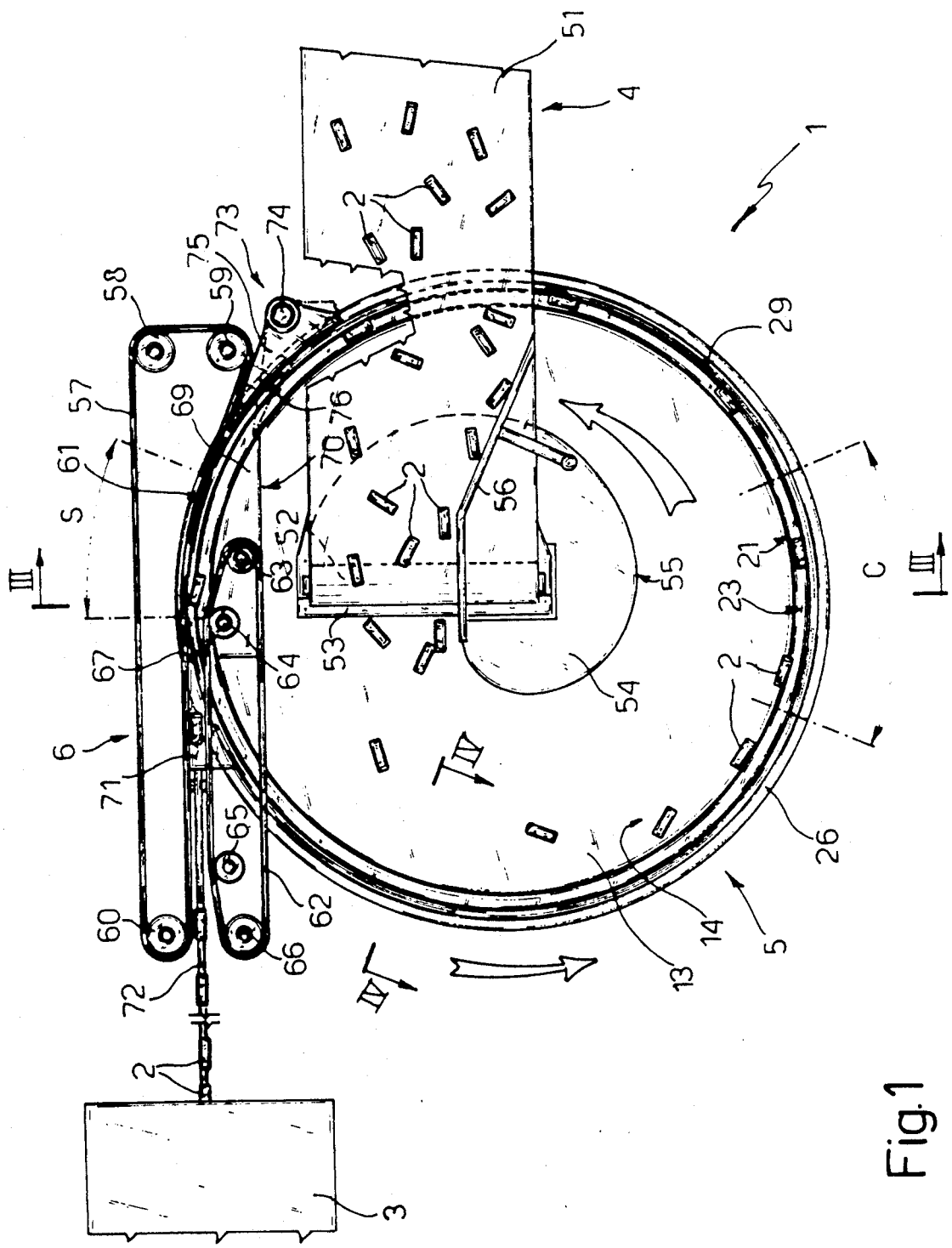
FIG. 1 shows a plan view, partly in blocks and with parts removed for simplicity, of a preferred embodiment of the aligning device according to the present invention.
Figure 2:
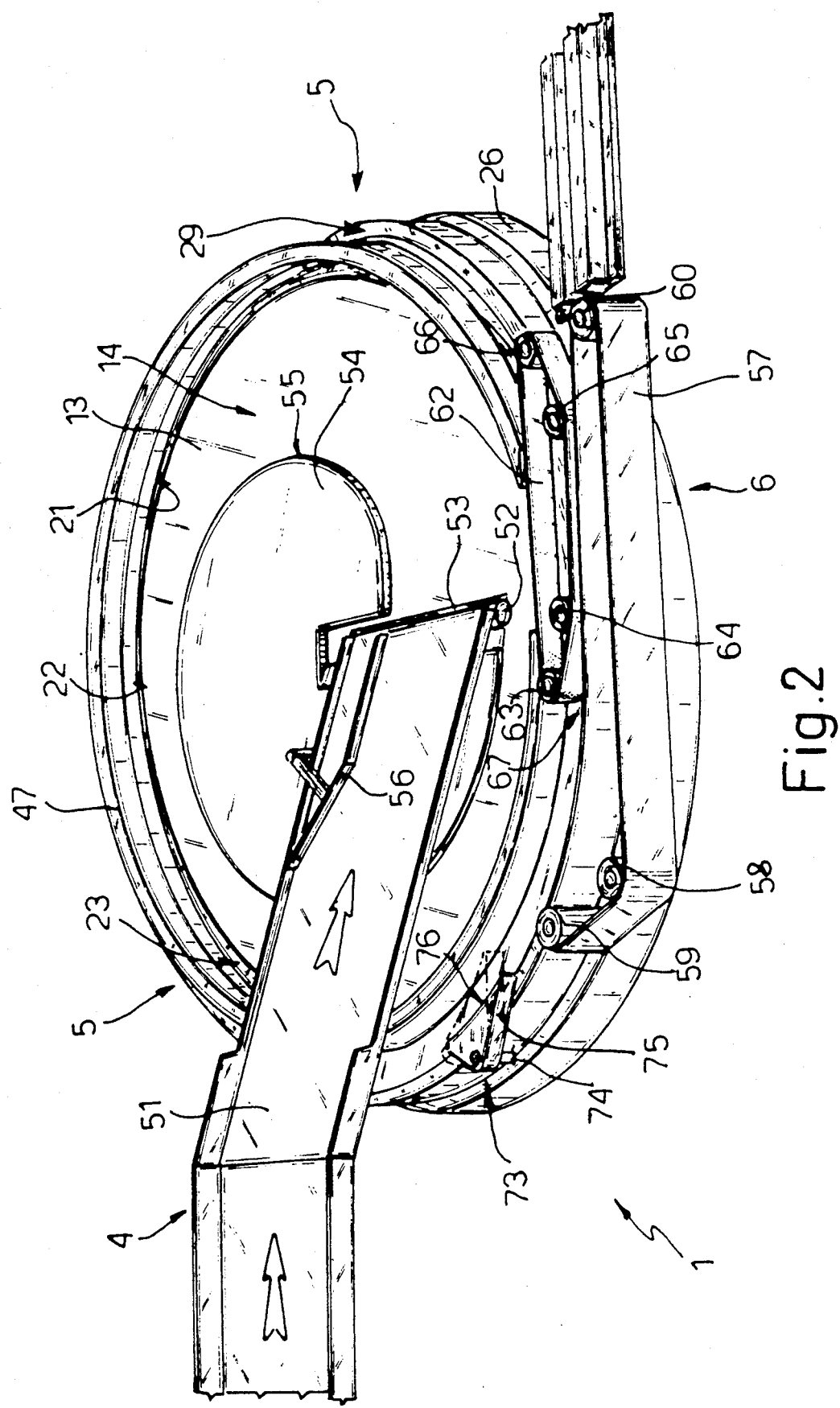
FIG. 2 shows a three-quarter top view in perspective of a detail in FIG. 1.
Figure 4:
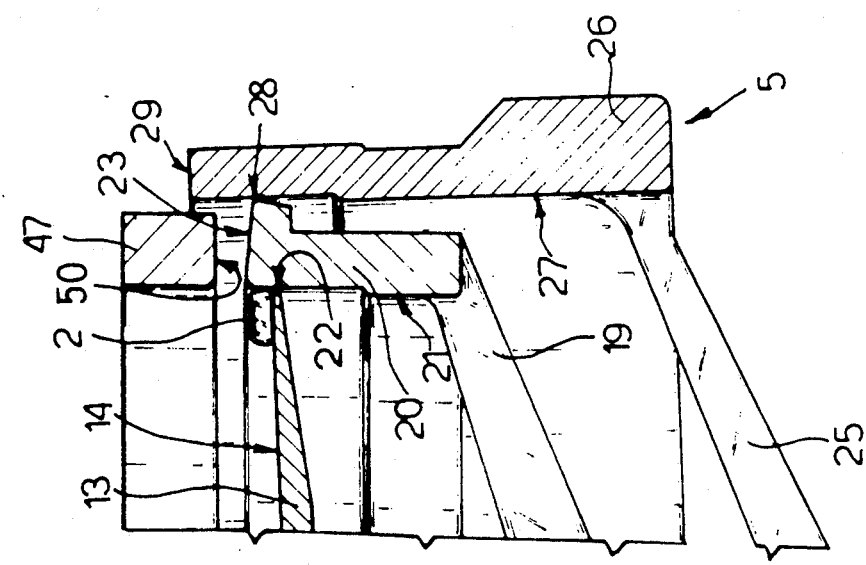
FIG. 4 shows a section along line IV—IV in FIG. 1.

Number 1 in FIG. 1 indicates an aligning device designed to feed a row of uniformly oriented product items, e.g. chocolates, 2 (FIGS. 4 to 6) on to a manufacturing machine, e.g. a wrapping machine, 3.

Aligning device 1 comprises an input conveyor 4 for feeding a continuous stream of items 2 in bulk on to an aligning drum 5, on which items 2 are oriented and fed, in line, on to an output conveyor 6 supplying machine 3. As shown, particularly in FIG. 3, drum 5 comprises a fixed base 7 having a through hole 8 through which extends a substantially vertical shaft 9 supported for rotation inside a coupling 10 coaxial with shaft 9 and extending upwards from a base flange 11 connected to the upper surface of base 7 by means of screws 12.

The top end of shaft 9 extends beyond the top end of coupling 10, and is fitted integral with a disc 13 consisting of a flat circular plate having a substantially horizontal upper surface 14 and turning with shaft 9 about an axis 15 coincident with the axis of said shaft 9.

Close to the top end, coupling 10 is fitted with an inclined cylindrical outer coupling 16, the axis 17 of which forms a given angle A, of about 2°, with said axis 15. Coupling 16 supports a rotary cylindrical hub 18 coaxial with axis 17 and integral with a number of spokes 19 sloping upwards, extending substantially radially outwards, and supporting an annular body 20 on the top end.

Annular body 20 is of substantially rectangular section, and presents a cylindrical inner surface 21 surrounding and substantially contacting edge 22 of disc 13, and an upper annular surface 23 preferably consisting, as in the example shown, of a conical surface sloping outwardly downwards.

A bottom portion of coupling 10 supports a rotary cylindrical hub 24 coaxial with axis 15 and integral with a number of spokes 25 sloping upwards, extending substantially radially outwards, and supporting an annular body 26 on the top end.

Annular body 26 is of substantially rectangular section, and is defined by a cylindrical inner surface 27 surrounding and substantially contacting outer edge 28 of annular body 20, and an upper annular surface 29.

Surface 29 is located over upper surface 14 of disc 13, and annular body 20 is so inclined that annular surface 23 presents a first portion (to the right in FIG. 3 and hereinafter referred to as loading portion C) substantially on a level with surface 14, and a second portion (to the left in FIG. 3 and hereinafter referred to as unloading portion S) diametrically opposite portion C and on a level with annular surface 29 of annular body 26.

Drum 5 comprises an actuating unit 30 in turn comprising a motor 31 supported in fixed manner on base 7 and having a through output shaft 32 fitted on the top end with a variable-diameter pulley 33 constituting a regulating means, and on the bottom end with a pulley 34. Said pulley 34 forms part of an actuating means comprising a belt drive 35, in turn comprising a further pulley 36 fitted on to the bottom end of shaft 9, and a belt 37 looped about pulleys 34 and 36. Said pulley 33 forms part of an actuating means comprising a further belt drive 38, in turn comprising a further pulley 39 fitted on to hub 24, and a belt 40 looped about pulleys 33 and 39 and adjustable stretcher 41.

Drives 35 and 38 are designed to turn disc 13 (anticlockwise in FIG. 1) at a first given constant speed greater than, or at most equal to, the maximum speed of annular body 26. Annular body 20, on the other hand, turns (anticlockwise in FIG. 1) at the same speed as annular body 26, by virtue of being turned by the same via the interposition, between spokes 25 and 19, of a joint or connecting means 42 comprising an articulated intermediate connecting rod 43.

Over coupling 16, coupling 10 is fitted with a hub 44 from which extends outwards a radial arm 45, on the free end of which pivots a flexible wiper 46 extending in sliding contact with surface 21 of annular body 20 and with the outer edge of the bottom surface of disc 13. Over annular surface 23, there is provided an annular guide body 47 supported on a fixed wall 48 via a radial arm 49, and having a lower annular surface 50 lying in a plane perpendicular to axis 17. As shown, particularly in FIG. 3, annular body 47 is so designed and located that surface 50 moves facing a portion of annular surface 23 comprising said portion C, and at a distance from the same slightly greater than the thickness of items 2. At a further portion of annular surface 23 comprising said portion S, surface 50, still lying in a plane parallel to that of annular surface 23, moves towards axis 17 in relation to the corresponding portion of surface 23.

As shown in FIG. 1, input conveyor 4 comprises a feeding means consisting of a conveyor belt 51 looped about and sloping downwards towards a roller 52 located substantially radially over surface 14 of disc 13. The top branch of belt 51 blends with surface 14 via a plate 53 supported, together with roller 52, on a fixed plate or fixed covering means 54. Plate 54 is supported over and substantially contacting surface 14 by supporting means not shown, and presents an outer edge 55 winding about axis 15 and extending from an inner point located at the mid point of plate 53 to an outer point located at the outer end of plate 53. Plate 54 supports a deflecting member 56 extending in contact with the top branch of belt 51 and limiting the conveying surface of the same, at roller 52, to the portion of belt 51 extending outwards from the inner starting point of edge 55.

As shown in FIG. 1, output conveyor 6 comprises an external belt 57 looped about three pulleys 58, 59 and 60 having their axes parallel to axis 15 and supported in fixed manner on an external structure not shown. The portion of belt 57 extending between pulleys 59 and 60 presents a first portion contacting a portion of cylindrical outer surface 61 of annular body 26 at portion S of surface 23, and a second portion extending tangent to surface 61 in the direction of machine 3. Conveyor 6 also comprises an internal belt 62 looped about four pulleys 63, 64, 65 and 66 having their axes parallel to axis 15 and supported in fixed manner on an external structure not shown. The portion of bet 62 extending between pulleys 64 and 65 extends substantially tangent to inner cylindrical surface 27 of annular body 26 and parallel to said second portion of belt 57 extending between pulleys 59 and 60, so as to define, with said second portion, a channel 67 of approximately the same width as item 2.

Figure 3:
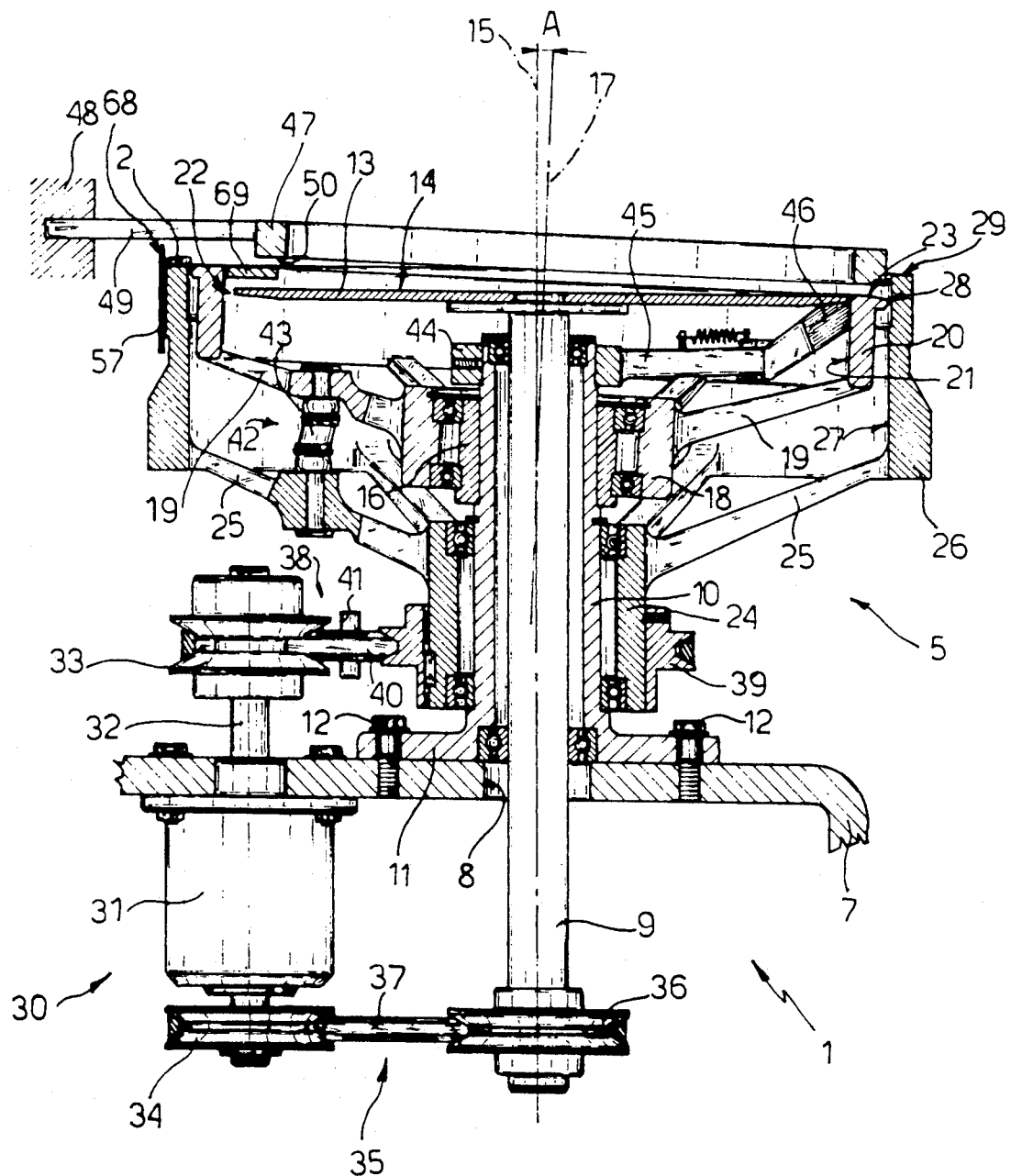
FIG. 3 shows a section along line III—III in FIG. 1, with parts removed for simplicity.

As shown in FIG. 3, the width of belt 57 is such that a bottom portion is located beneath the plane of annular surface 29, while a top portion 68 projects upwards beyond surface 29 by an amount at least equal to the thickness of item 2. Belt 62 is substantially the same width as top portion 68 of belt 57, and extends just over the plane of surface 29. In particular (FIG. 1), one portion of belt 62 extends over surface 14 of disc 13, across annular surfaces 23 and 29, and is looped about pulleys 63 and 64. These are supported for rotation on pins integral with said external structure (not shown) and supporting a wedge-shaped member 69 tangent to surface 21 and extending over surface 14 of disc 13, so as to define, with said surface 14, a passage 70 of at least the same thickness as item 2.

Belt 57 is driven by annular body 26, and in turn drives belt 62 via a drive (not shown) located between pulleys 60 and 66.

As shown in FIG. 1, an initial portion of the bottom surface of channel 67 lying in the same plane as surface 29 is defined by a fixed plate 71 tangent to surface 61, while the remaining portion is defined by the top branch of a conveyor belt 72 driven at the same speed as belts 57 and 62 by said drive (not shown) between pulleys 60 and 66, and constituting the input conveyor of machine 3.

A deflecting member 73, supported on an external structure (not shown), is assigned to a peripheral portion of drum 5 immediately upstream (in relation to the rotation direction of annular body 26) from the portion of surface 61 contacted by belt 57. Deflecting member 73 comprises a powered shaft 74 parallel to shaft 9 and fitted on the top end with an arm 75 located just over surfaces 23 and 29 and having a curved surface 76 which, when arm 75 is turned by shaft 74, is designed to move from an idle position, wherein it is located along the outer edge of surface 29, to an operating position wherein it extends transversely over surfaces 23 and 39.

In actual use, shaft 9 is turned by drive 35 so as to turn disc 13 at such a speed as to overcome the friction between disc 13 and item 2 located on surface 14 at a distance of other than zero from axis 15, and so spin item 2 outwards on to surface 21 of annular body 20. Annular bodies 20 and 26, on the other hand, are turned by drive 38 in the same direction as disc 13, but at a slower speed, which speed is controlled, as explained later on, by machine 3 via a known servomechanism (not shown) assigned to variable-diameter pulley 33. A continuous stream of items 2 is fed in bulk on to surface 14 of disc 13 by input conveyor 4, some of items 2 on belt 51 being detoured by deflecting member 56, so as to drop on to surface 14 at a given distance from axis 15. On reaching surface 14, said stream of items 2 fans out, by virtue of the centrifugal force on items 2 increasing in proportion to the distance of the said from axis 15. Consequently, once unloaded off belt 51, items 2 furthest from axis 15 proceed in practically a straight line on to surface 21, whereas those closer to axis 15 are deflected outwards, in reverse proportion to the distance from axis 15 and anticlockwise in FIG. 1, on to surface 21. In other words, items 2 unloaded simultaneously off belt 51 are spun outwards so as to substantially line up, separately spaced, along the periphery of surface 14 and contacting (FIG. 4) the portion of surface 21 extending between portions C and S of surface 23.

As shown in FIG. 3, on the portion of drum 5 wherein items 2 contact surface 21, said surface 21 projects over surface 14 by an amount gradually decreasing towards portion C of surface 23.

On reaching surface 21, items 2 are fed, contacting surface 21, along a circular route defined by the intersection of surfaces 14 and 21 and along which, by virtue of both centrifugal force and the difference in speed of surfaces 14 and 21, items 2 tend to assume a position of minimum potential energy. If, for example, as is usually the case, items 2 present a substantially rectangular horizontal section, said minimum potential energy position is that in which the largest lateral surface of item 2 is arranged contacting surface 21.

Figure 5:
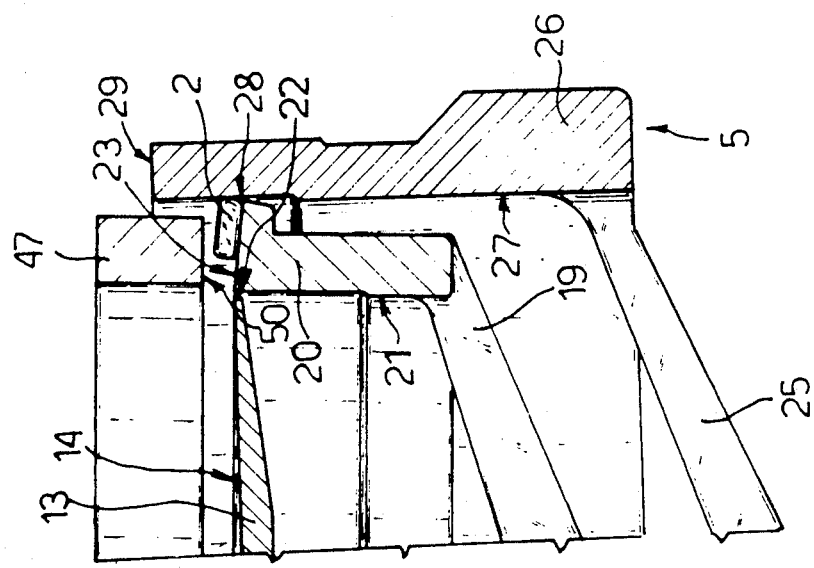
FIG. 5 shows a larger-scale view, with parts removed for simplicity, of a first detail in FIG. 3.

Items 2 continue along said circular route as far as portion C, at which point surface 23 moves down flush with surface 14, so as to enable items 2, arranged in line and uniformly oriented, to be spun off disc 13 and up on to surface 23 (FIG. 5). Portion C thus acts a junction at which a line of uniformly oriented items 2 is transferred from said circular route defined by surfaces 14 and 21 (hereinafter referred to as the "internal route") on to a further circular route (hereinafter referred to as the "external route") defined by surfaces 23 and 27 and substantially equal in width to the smallest transverse dimension of items 2. Generally speaking, not all of items 2 on disc 13 are fed immediately on to surface 23, some of which continue circulating on disc 13, on the portion of surface 14 not occupied by plate 54, the function of which is to prevent items 2 from remaining too close to axis 15 and getting jammed beneath the end portion of input conveyor 4.

As shown in FIG. 5, at portion C, surface 50 of annular body 47 is arranged facing surface 23 and at a distance from the same slightly greater than the thickness of items 2, so as to prevent two or more superimposed items 2 from being fed on to surface 23.

The line of items 2 travelling along said external route is fed by annular body 20 to portion S, at which point (FIG. 6) items 2 move up one by one on to surface 29 of annular body 26, and successively engage output channel 67, the width of which is such that items 2 are gripped between belts 57 and 62 and fed, with substantially no sliding contact with plate 71, along the output route defined by conveyor 72.

Portion S thus acts as a junction at which a line of uniformly oriented items 2 is transferred from said external route on to said output route.

Figure 6:
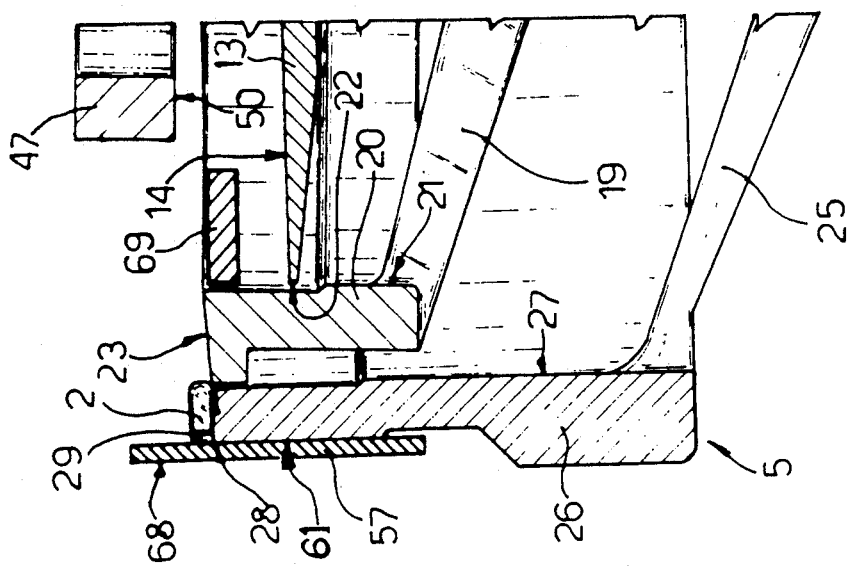
FIG. 6 shows a larger-scale view, with parts removed for simplicity, of a second detail in FIG. 3.

As shown in FIG. 6, at portion S, annular body 47 is withdrawn in relation to surfaces 23 and 29, to enable any misoriented items 2, incapable of engaging channel 67, to drop back down on to disc 13.

As already stated, the speed of belts 57 and 62 and conveyor 72 equals the surface speed of annular body 26 by which they are driven. As said speed must be such as to ensure a supply of items 2 equal to the instantaneous capacity of machine 3, provision is made for connecting machine 3 to device 1 by means of a control line (not shown) comprising a servomechanism (not shown) for controlling drive 38 via pulley 33, and designed to continuously adapt the supply of items 2 from device 1 to the instantaneous capacity of machine 3.

In the event of a temporary stoppage of machine 3, arm 75 is switched from the idle to the operating position, so as to enable items 2 on said external route to drop back down on to disc 13. In this case, device 1 may act, for a relatively short period, as a storage facility between machine 3 and the machine (not shown) supplying items 2 on to conveyor belt 51.

We claim:

1. A product aligning device (1) designed to receive said product (2) in bulk and to feed the same, correctly oriented and aligned, on to a manufacturing machine (3), in particular, a wrapping machine; said device (1) comprising a flat disc (13) turning about a first axis (15); first actuating means (35) for turning said disc (13) about said first axis (15) at a first given speed; means (51) for feeding said product (2) in bulk on to the upper surface (14) of said disc (13); and conveyor means (6) defining, for a neatly arranged row of said product items (2), an output route substantially tangent to the outer edge (22) of said disc (13); characterised by the fact that said device further comprises an inner annular body (20) turning about a second axis (17); and second actuating means (38) for turning said inner annular body (20) about said second axis (17) at a second given speed; said inner annular body (20) presenting an upper annular surface (23) located between said outer edge (22) of said disc (13) and said conveyor means (6) and defining a first annular route for a neatly arranged row of said product items (2), and a substantially cylindrical inner lateral surface (21) surrounding said outer edge (22) of said disc (13) and defining, with the upper surface (14) of the same, a second annular route for said product items (2); said first route being inclined in relation to both said second route and said output route, so as to define a first junction between said first and second routes, and a second junction between said first and said output routes, said first speed being such as to enable said product items (2) to be fed, by centrifugal force, from respective positions on said upper surface (14) of said disc (13) on to said second route and, one by one, through said first junction on to said first route.

2. A device as claimed in claim 1, characterised by the fact that said second speed is lower than said first speed; said second actuating means (38) comprising means (33) for regulating said second speed.

3. A device as claimed in claim 1, characterised by the fact that said device further comprises an outer annular body (26) coaxial with said disc (13) and having an upper annular surface (29) located over said upper surface (14) of said disc (13); said inner annular body (20) being an intermediate annular body located between said outer edge (22) of said disc (13) and said outer annular body (26); connecting means (43) being provided between said intermediate annular body (20) and said outer annular body (26) for enabling said intermediate annular body (20) to turn said outer annular body (26) about said second axis (17) at said second speed.

4. A device as claimed in claim 3, characterised by the fact that said intermediate annular body (20) is so inclined that said upper annular surface (23) of said intermediate annular body is flush with said upper surface (14) of said disc (13) at said first junction, and with said upper annular surface (29) of said outer annular body (26) at said second junction; said upper annular surface (29) of said outer annular body (26) defining an input portion of said output route.

5. A device as claimed in claim 3, characterised by the fact that said device further comprises fixed annular guide means (47) located over said inner annular body (20); said annular guide means (47) being arranged facing said upper annular surface (23) of said inner annular body (20) at said first junction, and being located at a distance from said upper annular surface (23) of said inner annular body at least equal to the thickness of said product items (2).

6. A device as claimed in claim 1, characterised by the fact that said device further comprises deflecting means (73) designed to move between an operating position so as to cooperate with said product items (2) travelling along said first route, and an idle non-cooperating position.

7. A device as claimed in claim 3, characterised by the fact that said conveyor means (6) comprise a number of looped belts (57, 62); one of said belts (57) being a drive belt designed to feed said product items (2) along said output route at a speed equal to that at which said product items (2) travel along said first route.

8. A device as claimed in claim 7,
characterised by the fact that a portion of said drive belt (57) extends contacting the outer cylindrical surface of said outer annular body (26); said second actuating means (38) activating said drive belt (57) via said outer annular body (26).

9. A device as claimed in claim 1,
characterised by the fact that said device further comprises fixed means (54) for covering a central portion of said upper surface (14) of said disc (13) and so preventing said product items (2) from contacting said central surface portion.

* * * * *